United States Patent [19]
Steele et al.

[11] Patent Number: 4,969,392
[45] Date of Patent: Nov. 13, 1990

[54] GRAVITY FEED COFFEE MAKER

[75] Inventors: Peter R. Steele, Monroe Township, Miami County, Ohio; Richard L. Stottmann, Louisville, Ky.

[73] Assignee: Whirlpool Corporation, Benton Harbor, Mich.

[21] Appl. No.: 352,475

[22] Filed: May 16, 1989

[51] Int. Cl.⁵ ............................................. A47J 31/00
[52] U.S. Cl. ........................................ 99/282; 99/295; 99/299; 99/305; 251/129.21; 251/331
[58] Field of Search ................. 99/279, 280, 281, 282, 99/283, 295, 299, 300, 305, 306; 251/129.21, 331; 426/433

[56] References Cited

U.S. PATENT DOCUMENTS

| | | | |
|---|---|---|---|
| 3,442,199 | 5/1969 | McGrail | 99/283 |
| 3,518,933 | 7/1970 | Weber | 99/283 |
| 3,584,568 | 6/1971 | Hausam | 99/305 |
| 4,413,552 | 11/1983 | Daugherty | 99/295 |
| 4,759,274 | 7/1988 | Schmidt | 99/295 |

Primary Examiner—Robert W. Jenkins
Attorney, Agent, or Firm—Mason, Kolehmainen, Rathburn & Wyss

[57] ABSTRACT

A gravity feed coffeemaker includes a water reservoir disposed above a filter basket in which coffee is brewed. The water reservoir has a valve disposed in its bottom, the valve being controlled to open only after the water held in the reservoir has reached a predetermined temperature to provide a substantially even flow of water at a desired temperature across coffee grounds contained in the filter basket. In one embodiment, the valve includes a bladder that is deformable to open the valve. In a second embodiment, a solenoid valve is employed, the solenoid valve having coils wound about a valve body having a centrally located aperture with a plunger disposed therein. The plunger moves in response to an electromagentic field generated when the coils are energized to open the valve.

40 Claims, 3 Drawing Sheets

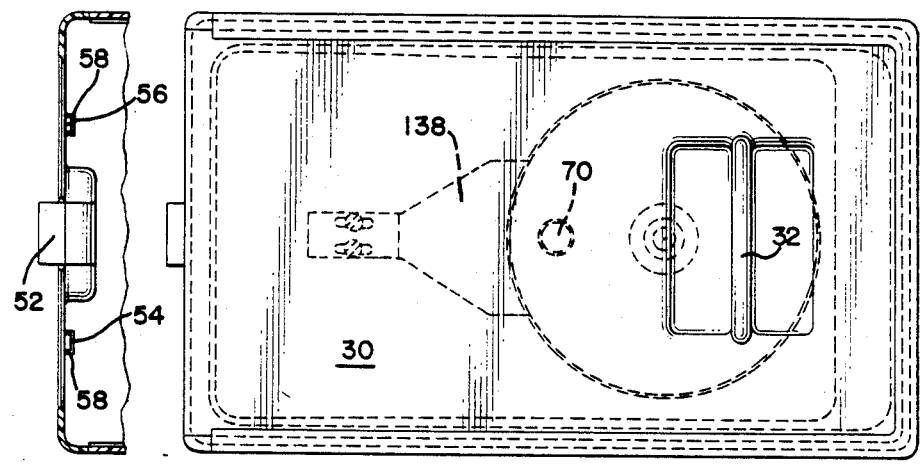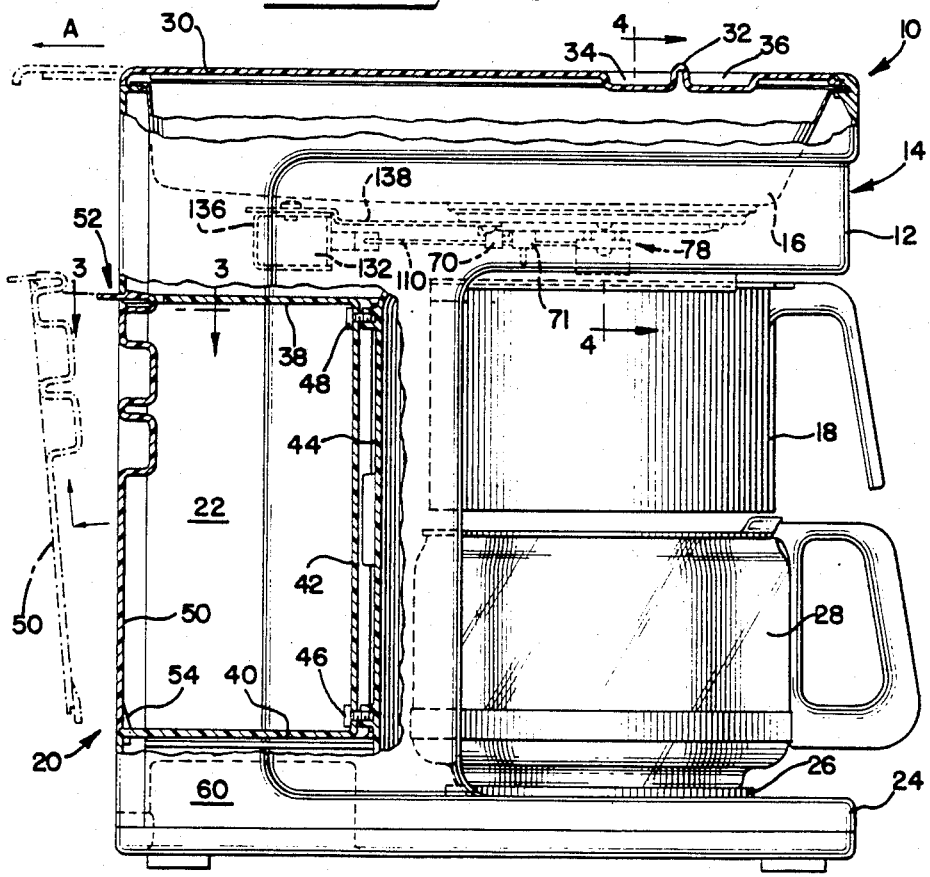

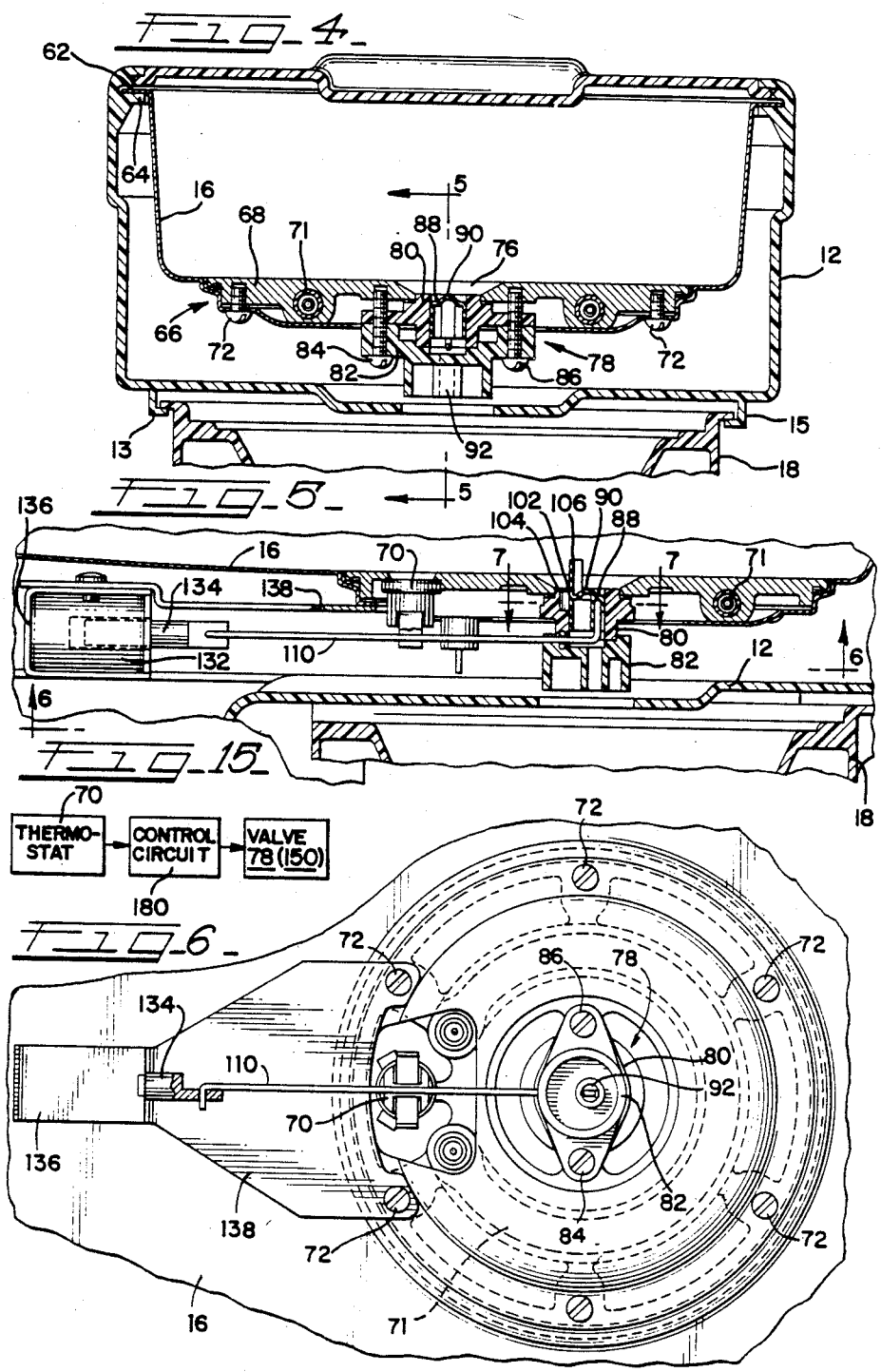

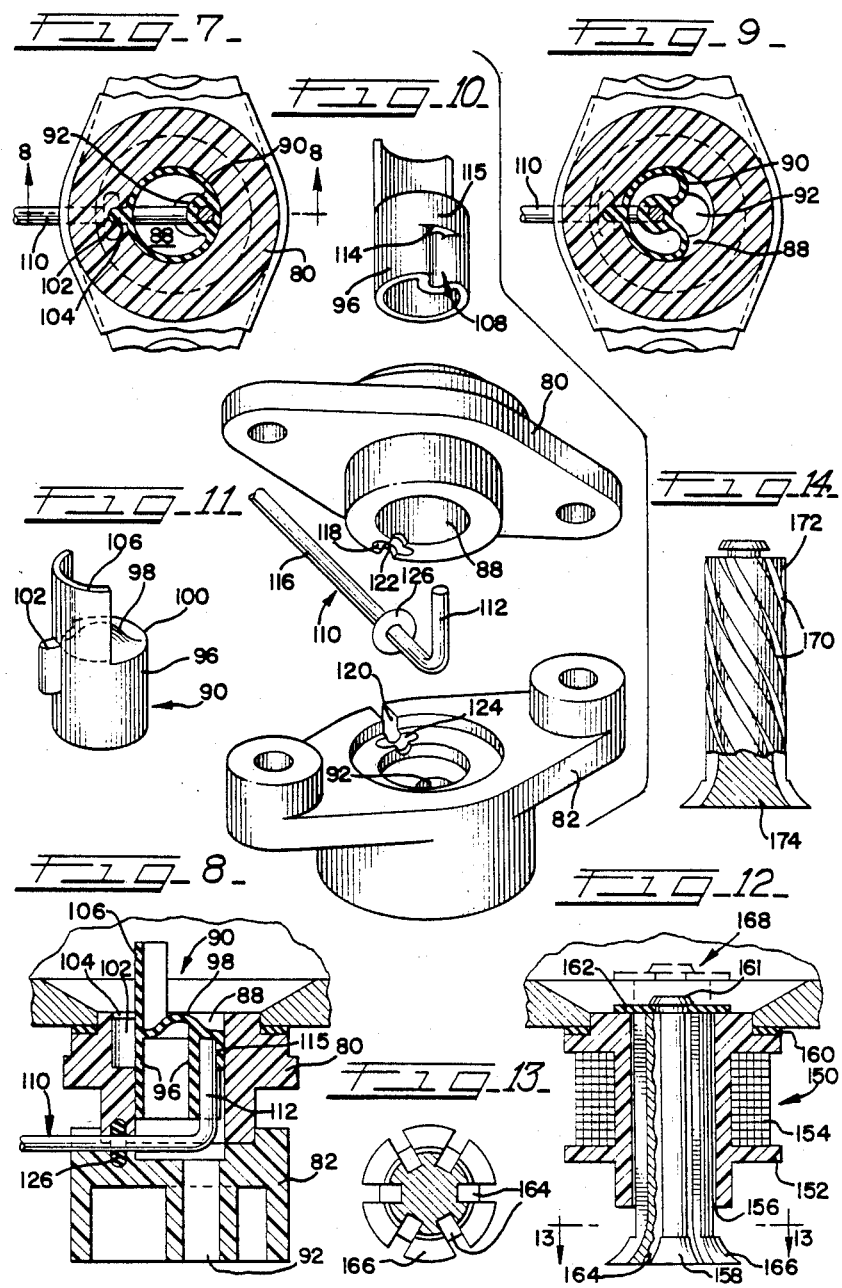

GRAVITY FEED COFFEE MAKER

BACKGROUND OF THE INVENTION

1. Field of the Invention

The present invention relates to a coffeemaker and more particularly to a gravity feed automatic coffeemaker having a water reservoir disposed above a filter basket, the reservoir having a valve that is controlled to open only after the water held in the reservoir has reached a predetermined temperature to provide a substantially even flow of water through the valve to the filter basket and across the coffee grounds contained therein.

2. Description of the Prior Art

Single pass automatic coffeemakers of the heat pump type are known to include a cold water reservoir separated from a heated channel by a one way check valve that allows cold water from the reservoir to enter the channel where a heat pump heats the water. As localized boiling occurs in the heated channel, heated water is pulsed out of the channel into a filter basket containing coffee grounds. At the start of the brew cycle, the water pulsed out of the heated channel is absorbed by the coffee grounds. When the coffee grounds can no longer absorb water pulsed into the filter basket, coffee formed by the interaction between the water and the coffee grounds is dripped from the filter basket into a coffee carafe. Typically, the first few ounces of water pulsed into the filter basket is in contact with the coffee grounds for as long as 15-20 seconds before a smooth flow of coffee from the filter basket is produced. This period of time is greater than necessary to brew the coffee resulting in over extraction such that the coffee produced at the beginning of the brew cycle has an undesirable bitter taste. Over extraction due to contact between the coffee grounds and water at temperatures that are too high for a period of time that is too long also occurs at the end of the brew cycle.

Another known type of single pass automatic coffeemaker is the displacement or siphon feed type in which preheated water is displaced from a hot water tank by cold water entering the tank through a displacement mechanism. It has been found that lime deposits can build up in the hot water tank of coffeemakers of this type with the lime deposits being passed out to the filter basket during the displacement process. Further, the temperature of the water entering the filter basket can vary from the desired brewing temperatures.

A further known single pass automatic coffeemaker is a gravity feed type of coffeemaker having a cold water reservoir with a bimetal valve disposed in its bottom. A secondary reservoir having a heater is positioned beneath the cold water reservoir. When the heater is turned on, the bimetal valve is heated causing the valve to distort and allow water to pass from the cold water reservoir to the secondary reservoir. Cold water initially passing over the bimetal valve into the secondary reservoir causes the valve to close to some extent while heat from the heater thereafter causes the valve to open slightly, movement of the valve continuing until an equilibrium point is reached. The water passed through to the secondary reservoir is heated therein and when a sufficient amount of water is present in the secondary reservoir, the water spills out through overflow holes into a filter basket disposed therebeneath.

SUMMARY OF THE INVENTION

In accordance with the present invention, the disadvantages of prior art coffeemakers, as discussed above, have been overcome. The coffeemaker of the present invention provides a substantially even flow of water, having a constant temperature, across coffee grounds contained in a filter basket so as to prevent over extraction and bitter coffee from being produced at the beginning and end of the brew cycle. The coffeemaker of the present invention further requires little maintenance.

The coffeemaker of the present invention includes a single water reservoir disposed above the filter basket in which the coffee is brewed. A heater is formed in the bottom of the reservoir to heat the water contained therein to a predetermined temperature. The reservoir further includes a valve disposed in the bottom thereof and a thermostat for sensing the temperature of water contained in the reservoir. A valve control is responsive to the thermostat for opening the valve when a predetermined water temperature is sensed to allow water at a desired temperature to flow at a substantially constant rate from the reservoir to the filter basket.

In a first embodiment, the valve includes a valve body having an aperture therein and a bladder disposed in the aperture that seals the aperture in the valve's closed position. The bladder is deformable to provide in the valve's open position a passageway in the valve aperture that allows water to flow from the reservoir through the valve aperture to the filter basket. The deformable bladder has a nearly constant spring rate eliminating the need for a return mechanism. The bladder is also self-cleaning and self-sealing.

In a second embodiment, a solenoid valve is employed, the valve having coils disposed about a valve body with a centrally located aperture formed therein in which a plunger is disposed. A sealing member is secured to the upper surface of the plunger, wherein water in the reservoir maintains the member sealed against the valve body in the valve's closed position. The plunger moves in response to an electromagnetic field generated when the coils are energized to move the sealing member away from the valve body and provide a passageway for water from the reservoir into the filter basket through one or more grooves formed in the plunger's outer sidewall and extending the length thereof. Preferably, a number of grooves are formed in the plunger sidewall so that water is showered into the filter basket as opposed to flowing in a single stream. Further, the grooves may be helically disposed about the plunger sidewall, the plunger slowly self-rotating to sprinkle water in a circular pattern into the filter basket.

These and other objects, advantages and novel features of the present invention, as well as details of an illustrated embodiment thereof, will be more fully understood from the following description and the drawing.

BRIEF DESCRIPTION OF THE DRAWING

FIG. 1 is a top elevational view of a coffeemaker constructed in accordance with the present invention;

FIG. 2 is a side elevational view of the coffeemaker of FIG. 1 partially broken away;

FIG. 3 is a cross-sectional view taken along lines 3—3 of FIG. 2;

FIG. 4 is a cross-sectional view taken along lines 4—4 of FIG. 2;

FIG. 5 is a cross-sectional view taken along lines 5—5 of FIG. 4;

FIG. 6 is a bottom elevational view taken along lines 6—6 of FIG. 5;

FIG. 7 is an enlarged plan section taken along lines 7—7 of FIG. 5 illustrating the valve of FIGS. 4-6 in its closed FIG. 8 is a cross-sectional view taken along lines 8—8 of FIG. 7;

FIG. 9 is an enlarged plan section illustrating the valve of FIGS. 4-8 in its open position;

FIG. 10 is an exploded view of the valve shown in FIGS. 4-9;

FIG. 11 is a perspective view of the bladder of the valve illustrated in FIGS. 4-10;

FIG. 12 is a cross-sectional view of an alternative valve construction;

FIG. 13 is a plan sectional view taken along lines 13—13 of FIG. 12 illustrating the plunger of the alternative valve construction; and FIG. 14 is a perspective view partially broken away of an alternative plunger for use in the valve shown in FIG. 12.

DESCRIPTION OF THE PREFERRED EMBODIMENT

A gravity feed coffeemaker 10, constructed in accordance with the principals of the present invention and shown in FIGS. 1-3 includes a generally C-shaped main housing 12 made of plastic. The main housing 12 has an upper portion 14 in which a heated reservoir 16 is disposed above a filter basket 18 that is slidably received in tracks 13 and 15 (FIG. 4) formed in the main housing 12. A storage compartment 22 is formed in a mid portion 20 of the main housing 12. Beneath the storage compartment 22 is a compartment 60 that houses the power cord for the coffeemaker on a wind up spool or the like. A lower portion 24 of the main housing 12 forms a base having a warming heater 26 for a carafe 28. The coffeemaker further includes a cover 30 that is slidable in the direction of arrow A with respect to the main housing 12 to provide access to the reservoir 16 so that the reservoir 16 may be easily filled with water. The cover 30 is molded of plastic having a finger pull 32 formed between a pair of indentations 34 and 36.

The storage compartment 22 includes an upper wall 38 and a lower wall 40 that are integrally formed with a rear wall 42, the rear wall 42 being secured to a bight portion 44 of the main housing 12 by screws 46 and 48. The storage compartment 22 further includes a removable door 50 that is secured to the main housing 12 by a latch 52 disposed at its upper end. At its lower end, the door 50 includes a pair of pins 54 and 56 which are received in respective apertures 58 formed in the bottom wall 40 of the storage compartment 22. The storage compartment 22 provides a handy storage area for coffee, the filters for the filter basket 18 and the like.

The reservoir 16, as seen in greater detail in FIGS. 4-6, is made of stainless steel and includes a flange 62 disposed about its upper edge, the flange 62 resting on a flange 64 formed about an upper edge of the main housing 12 to support the reservoir 16. The bottom 66 of the water reservoir 16 is formed to accommodate an aluminum plate 68 in which a calrod heater 71 is embedded for heating water contained in the reservoir 16 to a predetermined temperature as sensed by a thermostat 70. The aluminum plate 66 is secured by six screws 72 to the bottom 66 of the reservoir 16 with a gasket 69 disposed therebetween such that the aluminum plate 68 forms a portion of the bottom of the reservoir 16. The aluminum plate 68 is formed with a well 76 therein that allows water contained in the reservoir 16 to drain off through a valve generally designated 78.

The valve 78, as shown in detail in FIGS. 4-8, includes a two piece valve body with an upper portion 80 and a lower portion 82 both of which are secured to the aluminum plate 68 by a pair of screws 84 and 86 with a gasket 87 being disposed between the valve body portion 80 and the aluminum plate 68. The upper valve body 80 includes an aperture 88 in which a deformable bladder 90 is disposed. The lower valve body 82 is also formed with a centrally disposed aperture 92. The aperture 92 of the lower valve body is aligned with the aperture 88 of the upper valve body 80 so as to provide a passageway for water contained in the reservoir 16 when the valve 78 is open.

The deformable bladder 90 includes a generally cylindrical outer sidewall 96 and an integrally formed domed top 98. Under a slight amount of pressure from water contained in the reservoir 16, the domed top 98 tends to flatten slightly, pushing the upper outer edge 100 of the deformable bladder 90 outward against the sidewall of the aperture 88 formed in the upper valve body 80 so as to provide an effective seal. A projection 102 is formed on the outer sidewall 96 of the deformable bladder 90 so as to be received in an aperture 104 formed in the upper valve body 80 to maintain the orientation of the deformable bladder 90 in the valve 78. The deformable bladder 90 is also formed with an upstanding arced flange 106 that forms a finger pull so that the bladder 90 may be easily removed from the aperture 88 of the upper valve body 80. A recess 108 is formed in the outer sidewall 96 of the deformable bladder 90, opposite the side of the deformable bladder 90 from which the finger pull 96 extends. The recess 108 of the deformable bladder 90 accommodates an actuator rod 110 such that an upstanding leg 112 of the actuator rod 110 is received into an opening 114 formed between the sidewall 96 of the recess 108 and an outer sidewall 115 disposed above the recess 108. The horizontal leg 116 of the actuator rod 110 extends through apertures 118 and 120 respectively formed in the upper and lower valve body portions 80 and 82, respectively, wherein each of the apertures 118 and 120 includes a recess 122 and 124 formed to accommodate an O-ring seal 126 that encircles the leg 116 of the actuator rod 110. The actuator rod 110 is coupled by a plunger 134 to a solenoid 132 which moves the rod 110 when actuated. Because the deformable bladder 90 has an essentially constant spring rate, the need for a spring to return the actuator rod 110 to the position depicted in FIGS. 5 and 7 is eliminated. The solenoid 132 is contained in a housing 136 that is secured to a mounting bracket 138 attached to the bottom 66 of the reservoir 16 by a pair of screws 140 and 142.

The valve 78 is controlled in response to the temperature sensed by the thermostat 70. When the water contained in the reservoir 16 reaches a predetermined temperature as sensed by the thermostat 70, the heater 71 is turned off and the solenoid 132 actuated to pull in the actuator rod 110 and move the deformable bladder 90 from its closed position, depicted in FIG. 7, to its open position, depicted in FIG. 9. When moved to its open position, the deformable bladder 90 uncovers a portion of the aperture 88 and the aperture 92 formed in the respective upper and lower valve body portions 80 and 82 so as to provide a passageway for water contained in the reservoir 16 to the filter basket 18. Further, as the deformable bladder 90 is moved into the valve's open position, the bladder 90 rolls in on itself providing a self-cleaning action.

An alternate embodiment of the valve 78 is shown in FIGS. 12 and 13 in which a solenoid valve 150 is employed. The solenoid valve 150 includes a spool type valve body 152 about which coils 154 are wound. The valve body 152 includes a centrally disposed aperture 156 to accommodate a stainless steel plunger 158. A gasket 160 provides an interface between the valve body 152 and the aluminum plate 68. The plunger 158 includes a projection 161 at its upper end to secure a sealing gasket 162 thereto. The gasket 162 forms a seal with the valve body 152 in the closed position of the valve 150 wherein the weight of the water in the reservoir 16 maintains the gasket 162 sealed against the valve body. The plunger 158 also includes a number of grooves 164 formed about its outer periphery, the grooves 164 extending the length of the plunger 158 from the gasket 162 to a shower head portion 166 formed at the bottom of the plunger 158. The shower head portion 166 has a diameter which increases from its top 167 to its bottom 169 wherein the grooves 162 to curve outward towards the bottom 169 so that water flowing out from the grooves 162 does not bore into the coffee grounds.

The valve 150 is actuated with the energization of the coils 154 by a conventional control circuit 180, shown in FIG. 15, in response to the thermostat 70 sensing that the contents of the reservoir 16 has reached a predetermined temperature. When the coils are energized, the electromagnetic field generated moves the plunger 158 upward to the position depicted at 168 so as to allow water contained in the water reservoir 16 to flow through the grooves 164 out from the shower head portion 166 providing an even flow of water over the coffee grounds contained in the filter basket 118.

In an alternate embodiment, the valve 150 may be formed with a number of grooves 170 helically disposed about the outer surface of the plunger 172 as seen for the stainless steel plunger 172 shown in FIG. 14. In the presence of an electromagnetic field, the plunger 172 self-rotates very slowly to provide a sprinkling of water from a shower head portion 174 onto the coffee grounds in the filter basket 18.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A coffeemaker comprising:
   filter means for brewing coffee, said filter means having a top opening formed therein;
   a water reservoir disposed above said filter means;
   means for heating the contents of said reservoir;
   a valve movable between open and closed positions disposed in the bottom of said reservoir above the opening in said filter means, said valve including a valve body having an aperture therein and a bladder disposed in said aperture to seal said aperture in said valve's closed position, said bladder being deformable to provide a passageway in said aperture to allow water to flow from said reservoir through said aperture to said filter means when said valve is in said open position;
   means for sensing the temperature of water in said reservoir; and
   control means responsive to said temperature sensing means for actuating said valve to pen in response to the sensing of a predetermined water temperature to allow water to flow at a substantially constant rate from said reservoir to said filter means.

2. A coffeemaker as recited in claim 1 wherein said bladder includes a domed top that flattens in response to a downward pressure thereon exerting a radial force to seal said aperture in said valve's closed position.

3. A coffeemaker as recited in claim 1 wherein said bladder includes a flange extending upwardly from a portion of the periphery of an upper surface of said bladder so as to aid the removal of said bladder from said valve body.

4. A coffeemaker as recited in claim 1 wherein said aperture includes a recess therein and said bladder includes a projection receivable in said recess to maintain the orientation of said bladder in said aperture.

5. A coffeemaker as recited in claim 1 wherein said aperture has a cylindrical sidewall with a recess formed therein, said control means including a solenoid and an actuator rod coupled to said solenoid and receivable in said recess to deform said bladder and open said valve.

6. A coffeemaker as recited in claim 1 wherein said water reservoir is made of stainless steel.

7. A coffeemaker as recited in claim 1 wherein said heating means forms a portion of the bottom of said water reservoir.

8. A coffeemaker as recited in claim 7 wherein said heating means includes an aluminum, plate with a heating element embedded therein.

9. A coffeemaker as recited in claim 8 wherein said aluminum plate includes an aperture therein forming a well leading to said valve.

10. A coffeemaker as recited in claim 1 including a housing for said water reservoir and a cover disposed over said water reservoir, said cover engaging a portion of said housing and being slidable with respect thereto for uncovering said water reservoir.

11. A coffeemaker as recited in claim 1 including a housing, a first portion of which is disposed above said filter means for housing said water reservoir, said housing having a second portion with a compartment formed therein for storage.

12. A coffeemaker as recited in claim 11 wherein said compartment includes a removable door.

13. A coffeemaker comprising:
   filter means for brewing coffee, said filter means having a top opening formed therein;
   a water reservoir disposed above said filter means;
   means for heating the contents of said reservoir;
   a valve movable between open and closed positions disposed in the bottom of said reservoir above the opening in said filter means, said valve being a solenoid valve having coils for providing an electromagnetic field, said coils being disposed about a valve body with a centrally located aperture formed therein and a plunger movable in response to an electromagnetic field, said plunger being disposed in said aperture and having at least one groove in its outer sidewall extending the length of said plunger and a sealing member disposed at one end of said plunger, said sealing member engaging said valve body in the valve's closed position and said sealing member disengaging said valve body in the valve's open position such that said groove provides a passageway from said reservoir to said filter means;

means for sensing the temperature of water in said reservoir; and control means responsive to said temperature sensing means for actuating said valve to pen in response to the sensing of a predetermined water temperature to allow water to flow at a substantially constant rate from said reservoir to said filter means.

14. A coffeemaker as recited in claim 13 wherein said plunger includes a plurality of grooves helically disposed about the sidewall of said plunger.

15. A coffeemaker as recited in claim 13 wherein said plunger includes a plurality of grooves to provide a plurality of passageways from said reservoir.

16. A coffeemaker as recited in claim 15 wherein said grooves curve outwardly at the bottom of said plunger.

17. A coffeemaker comprising:
a generally C-shaped housing including a horizontally extending upper portion, a horizontally extending lower portion forming a base, and a midportion extending generally vertically between said upper and lower portions;

a water reservoir disposed in said housing's upper portion;

means for heating the contents of said reservoir;

a valve movable between open and closed positions disposed in the bottom of said water reservoir, said valve including a valve body having an aperture therein and a bladder disposed in said aperture to seal said aperture in said valve's closed position, said bladder being deformable to provide a passageway in said aperture to allow water to flow from said reservoir through said aperture to said filter means when said valve is in said open position;

means for controlling said valve to open;

filter means for brewing coffee, said filter means having a top opening formed therein and being removably secured to said housing's upper portion beneath said water reservoir with said opening disposed under said valve to receive water directly therefrom when said valve is opened; and a compartment formed in said housing's midportion for storage.

18. A coffeemaker as recited in claim 17 wherein said storage compartment includes a removable door.

19. A coffeemaker as recited in claim 17 wherein said housing includes a cover disposed above said water reservoir, said cover being slidable with respect to said housing to provide access to said water reservoir.

20. A coffeemaker as recited in claim 17 wherein said bladder includes a domed top that flattens in response to a downward pressure thereon exerting a radial force to seal said aperture in said valve's closed position.

21. A coffeemaker as recited in claim 17 wherein said bladder includes a flange extending upwardly from a portion of the periphery of an upper surface of said bladder so as to aid the removal of said bladder from said valve body.

22. A coffeemaker as recited in claim 17 wherein said aperture includes a recess therein and said bladder includes a projection receivable in said recess to maintain the orientation of said bladder in said aperture.

23. A coffeemaker as recited in claim 17 wherein said aperture has a cylindrical sidewall with a recess formed therein, said control means including a solenoid and an actuator rod coupled to said solenoid and receivable in said recess to deform said bladder and open said valve.

24. A coffeemaker as recited in claim 17 wherein said water reservoir is made of stainless steel.

25. A coffeemaker as recited in claim 17 wherein said heating means forms a portion of the bottom of said water reservoir.

26. A coffeemaker as recited in claim 25 wherein said heating means includes an aluminum plate with a heating element embedded therein.

27. A coffeemaker as recited in claim 26 wherein said aluminum plate includes an aperture therein forming a well leading to said valve.

28. A coffeemaker comprising:
a generally C-shaped housing including a horizontally extending upper portion, a horizontally extending lower portion forming a base, and a midportion extending generally vertically between said upper and lower portions;

a water reservoir disposed in said housing's upper portion;

means for heating the contents of said reservoir;

a valve movable between open and closed positions disposed in the bottom of said water reservoir, said valve being a solenoid valve having coils for providing an electromagnetic field, said coils being disposed about a valve body with a centrally located aperture formed therein and a plunger movable in response to an electromagnetic field, said plunger being disposed in said aperture and having at least one groove in its outer sidewall extending the length of said plunger and a sealing member disposed at one end of said plunger, said sealing member engaging said valve body in the valve's closed position and said sealing member disengaging said valve body in the valve's open position such that said groove provides a passageway from said reservoir to said filter means;

means for controlling said valve to open;

filter means for brewing coffee, said filter means having a top opening formed therein and being removably secured to said housing's upper portion beneath said water reservoir with said opening disposed under said valve to receive water directly therefrom when said valve is opened; and a compartment formed in said housing's midportion for storage.

29. A coffeemaker as recited in claim 28 wherein said plunger includes a plurality of grooves helically disposed about the sidewall of said plunger.

30. A coffeemaker as recited in claim 28 wherein said plunger includes a plurality of grooves to provide a plurality of passageways from said reservoir.

31. A coffeemaker as recited in claim 30 wherein said grooves curve outwardly at the bottom of said plunger.

32. A coffeemaker comprising:
filter means for brewing coffee, said filter means having a top opening formed therein;

a water reservoir disposed above said filter means;

means for heating the contents of said water reservoir;

a valve disposed in the bottom of said reservoir above the opening in said filter means, said valve having a body with an aperture therein and a bladder disposed in said aperture to seal said aperture in a closed position of said valve, said bladder being deformable to provide a passageway in said aperture to allow water to flow from said water reservoir through said aperture to said filter means in an open position of said valve; and means for controlling said valve to open.

33. A coffeemaker as recited in claim 32 wherein said bladder includes a domed top that flattens in response to a downward pressure thereon exerting a radial force to seal said aperture in said valve's closed position.

34. A coffeemaker as recited in claim 32 wherein said bladder includes a flange extending upwardly from a portion of the periphery of an upper surface of said bladder so as to aid the removal of said bladder from said valve body.

35. A coffeemaker as recited in claim 32 wherein said aperture includes a recess therein and said bladder includes a projection receivable in said recess to maintain the orientation of said bladder in said aperture.

36. A coffeemaker as recited in claim 32 wherein said aperture has a cylindrical sidewall with a recess formed therein, said control means including a solenoid and an actuator rod coupled to said solenoid and receivable in said recess to deform said bladder and open said valve.

37. A coffeemaker comprising:
    filter means for brewing coffee, said filter means having a top opening formed therein;
    a water reservoir disposed above said filter means;
    means for heating the contents of said water reservoir;
    a solenoid valve disposed in the bottom of said reservoir above the opening in said filter means, said valve having a body with coils disposed thereabout for providing an electromagnetic field when said valve is actuated, a plunger disposed in an aperture formed in said valve body, said plunger being movable in response to an electromagnetic field and having at least one groove in its outer sidewall extending the length of said plunger, and a sealing member disposed at one end of said plunger to close said valve; and
    control means for energizing said coils to move said plunger and open said valve such that said groove provides a passageway for water from said water reservoir to said filter means.

38. A coffeemaker as recited in claim 37 wherein said plunger includes a plurality of grooves helically disposed about the sidewall of said plunger.

39. A coffeemaker as recited in claim 37 wherein said plunger includes a plurality of grooves to provide a plurality of passageways from said reservoir.

40. A coffeemaker as recited in claim 39 wherein said grooves curve outwardly at the bottom of said plunger.

* * * * *